(12) United States Patent
Burnett et al.

(10) Patent No.: US 7,244,070 B2
(45) Date of Patent: Jul. 17, 2007

(54) CAMERA HOLDER AND METHODS

(75) Inventors: Chad R. Burnett, Aurora, CO (US); Howard Steve Ellenburg, Boulder, CO (US); Kenneth D. Wandry, Highlands Ranch, CO (US)

(73) Assignee: Xtend Products, LLC, Greenwood Village, CO (US)

( * ) Notice: Subject to any disclaimer, the term of this patent is extended or adjusted under 35 U.S.C. 154(b) by 0 days.

(21) Appl. No.: 11/255,196

(22) Filed: Oct. 19, 2005

(65) Prior Publication Data

US 2007/0086776 A1    Apr. 19, 2007

(51) Int. Cl.
*G03B 17/20* (2006.01)
*F16M 13/00* (2006.01)

(52) U.S. Cl. ...................... 396/420; 248/118
(58) Field of Classification Search ................ 396/420, 396/421; 352/243; 42/94; 248/118, 354.1, 248/412; 224/269, 908; 124/89
See application file for complete search history.

(56) References Cited

U.S. PATENT DOCUMENTS

| 167,169 | A | | 8/1875 | Hare |
|---|---|---|---|---|
| 3,390,477 | A | | 7/1968 | Galbraith |
| 4,475,676 | A | * | 10/1984 | Smith .......................... 224/247 |
| 4,844,390 | A | * | 7/1989 | Duke .......................... 248/118 |
| 5,104,188 | A | | 4/1992 | Jefferson |
| 5,111,983 | A | | 5/1992 | Simmons et al. |
| 5,351,867 | A | | 10/1994 | Vest |
| 5,784,820 | A | | 7/1998 | Wood |
| 5,819,461 | A | | 10/1998 | Killian |
| 6,082,034 | A | | 7/2000 | Musmanno |
| 6,736,357 | B2 | * | 5/2004 | Venn et al. ................. 248/118 |
| 2004/0031183 | A1 | | 2/2004 | Cain |

* cited by examiner

*Primary Examiner*—W. B. Perkey
(74) *Attorney, Agent, or Firm*—Townsend and Townsend and Crew LLP

(57) ABSTRACT

A portable device for stabilizing an arm or hand of a person. The device includes a stabilizer shaft having a peripheral section and a mating section, a stabilizer coupled with the peripheral section of the stabilizer shaft and configured to engage the arm or hand of the person, a base shaft having a peripheral section and a mating section and in slidable arrangement with the stabilizer shaft, an attachment assembly in cooperative association with the mating section of the stabilizer shaft and the mating section of the base shaft, and a garment clip coupled with the peripheral section of the base shaft. Methods of using and constructing a portable device for stabilizing an arm or a hand of a person are also provided.

19 Claims, 8 Drawing Sheets

CAMERA HOLDER AND METHODS

BACKGROUND OF THE INVENTION

This invention relates to the field of support devices, and in particular to portable support devices for use in video recording and other applications.

Home video enthusiasts have many opportunities to use camcorders for documenting events such as ballet recitals, sporting competitions, school programs, and the like. Yet these events often continue for extended periods of time, often upwards of an hour or longer. It can be difficult for the user to hold the camera in operating position throughout the entire event without experiencing arm strain or fatigue. In some cases, the camera operator's arm or hand may become shaky, thus diminishing the quality of the recording. In extreme cases, the operator has no other option but to terminate the recording session, and unfortunately cannot record the memory.

Some have tried using their non-recording arm as a prop to hold up their recording arm, yet this can lead to fatigue in both arms. On occasion, the use of a tripod can be helpful when recording from a location outside of a row of spectators, where operation of the camera does not block the view of others who are watching the event. However, when the operator finds herself at a sporting event in the bleacher section, at a dance recital sitting in the middle of the row, or perhaps in the center of an auditorium, the use of a tripod is often difficult or impossible. Further, when using a tripod it can be awkward to move the camera in three dimensions. Although some have proposed systems for supporting the arm of a camera user, these approaches often involve unwieldy devices that are difficult to transport when not in use, and can require the use of special straps or attachments. Relatedly, many of these devices are not easily adjustable by the user when moving from a standing position to a sitting position.

What is needed are devices and method to assist the operator in holding a camera with their own arm while at the same time preventing or minimizing fatigue. Ideally, such approaches would be amenable to the operator in any of a variety of recording situations and environments. Further, the devices would be self contained, compact, and simple to transport when not in use. The present invention provides an answer to such needs.

BRIEF SUMMARY OF THE INVENTION

According to one embodiment, the present invention provides a collapsible arm support. The support can include a collapsible structure that connects to a person's belt or waist, and typically holds the person's arm while they are taking photographs or videos. The device is adjustable to enable the user's upper arm to remain generally horizontal while filming. When not in use, the device may be collapsed by telescoping or by folding to make it easy to transport and store. By using the support, the operator can realize a significant improvement in the quality of his or her video recording because the operator can keep the camera level and still, or otherwise have greater control over the movement of the camera. This can be particularly useful when the operator uses a camera for an extended period of time, so as to reduce or prevent fatigue or strain. The present invention provides devices and methods that can be used in virtually any filming environment. Advantageously, an operator will find use for these techniques while filming in a standing position, or in a sitting position. It is appreciated that the devices and methods described herein can be used with various sizes and shapes of video cameras, including even the larger professional size cameras.

The weight of an operator's arm combined with the weight of a camera or other object can put a load on the operator's shoulder. The techniques of the present invention are effective in removing or reducing the load from the operator's shoulder, and transferring the load onto the support device. This provides several benefits for the user. For example, the user will realize increased hand or arm stability when recording or performing another activity. Often camcorders are small and lightweight, and therefore may be extra sensitive to slight hand shaking. This is especially true when zooming in on a target. By removing or reducing the load from the shoulder, and by providing a firm stable base upon which to hold the camera, the user will enjoy a noticeable increase in the picture quality, even if the user's arm is not fatigued. Furthermore, the user will have far more stamina and won't suffer from shoulder/arm fatigue which often causes additional hand shaking. The individual can operate a video camera, or engage in another activity, far longer than normal with a higher quality result.

The present invention provides an arm or hand support that allows for full and complete mobility in a variety of positions or situations. While equipped with the device, a user can stand, walk, move around, or even sit, and the height of the device can be adjusted with ease using adjusting mechanisms or clamps. Moreover, such adjustments can be made quickly with one hand. It is appreciated that the present techniques can be used indoors, in homes, schools, gyms, auditoriums, in various seating arrangements including stadium seating and flat seating, outdoors, on lawns, in parks, fields, while sitting behind people, with people on both sides, and the like. The device of the present invention can be easily collapsed into a low profile compact configuration, and quickly extended for use. Because it can be so easily and quickly adjusted to various lengths, it is ideal for use by people of different heights, regardless of whether they may be standing or sitting. Further, due to the smoothness with which the length of the device can be adjusted, an operator can continue filming while at the same time making length adjustments, for example when changing from a standing position to a sitting position.

The present invention provides ergonomically friendly features. For example, the device may include a curved support configured to fit under the user's arm. Such a support can be sized so as to accommodate all arm sizes comfortably. The device may also include a curved support configured to engage the user's leg when in sitting position. The device often will include an integrated belt or pant attachment which allows for quick and firm support of the device while standing or moving. The present invention is portable, lightweight, compact, simple to use, and requires minimal setup time. It can be used with the right arm as readily as it can be used with the left arm. Advantageously, the device can fit into many video camera bags, and can also be flipped upside down and carried on a belt or other garment.

Although many of the embodiments described herein relate the use of a device for providing stability and support for recording digital or analog videos, it is appreciated that the present invention will find use for any of a variety of activities where arm stability or support is desirable. For example, the device may be used with rifles or handguns when the user is hunting or sport shooting. In some instances, it may be desirable to use one device for the right arm, and another device for the left arm. For example, two devices can be used to support a user's arms while he is looking through binoculars during hunting, bird watching, or other animal watching expeditions. The devices and methods of the present invention are similarly well suited for stabilizing a user's arm or hand when painting a canvass, a portrait, or similar type of fine artwork. The present invention can also be used when sitting in a chair or couch to support a user's wrist or forearm while reading a book or magazine. In such cases, a base of the device may be propped on the user's leg or on the furniture.

In a first aspect, the present invention provides a portable device for stabilizing an arm or hand of a person. The device can include a stabilizer shaft including a peripheral section and a mating section, a stabilizer coupled with the peripheral section of the stabilizer shaft and configured to engage the arm or hand of the person, a base shaft in slidable arrangement with the stabilizer shaft, where the base shaft includes a peripheral section and a mating section, an attachment assembly in cooperative association with the mating section of the stabilizer shaft and the mating section of the base shaft, where the attachment assembly is configured to releasably fix the stabilizer shaft relative to the base shaft, and a garment clip coupled with the peripheral section of the base shaft, where the garment clip includes a first cleft and a second cleft. The first cleft may be configured to engage a garment worn by the person when the device is upright, and the second cleft can be configured to engage the garment worn by the person when the device is inverted.

In some embodiments, the attachment assembly can include an intermediate shaft having a first section and a second section, a first clamp in cooperative association with the first section of the intermediate shaft and the mating section of the stabilizer shaft, the first clamp configured to releasably fix the stabilizer shaft relative to the intermediate shaft, and a second clamp in cooperative association with the second section of the intermediate shaft and the mating section of the base shaft. The second clamp can be configured to releasably fix the intermediate shaft relative to the base shaft. The first cleft can be at least partially defined by an inner elongate member disposed alongside and in fixed relation to the peripheral section of the base shaft and an outer elongate member disposed alongside and in fixed relation to the inner elongate member. The second cleft can be at least partially defined by the inner elongate member and a portion of the peripheral section of the base shaft. In some cases, the garment clip is fixed directly to the peripheral section of the base shaft.

The portable device may also include a base coupled with the peripheral section of the base shaft, where the base is configured to contact a support body portion of the person. In some embodiments, the garment clip may be fixed directly to the base. In related embodiments, the attachment assembly can include a clamp having a stabilizer ring fixed with the mating section of the stabilizer shaft, and a base ring slidably engaged with the base shaft. The clamp can include an eccentric locking mechanism in operative association with the base ring. The locking mechanism may have a locked configuration that fixes the position of the base ring relative to the mating section of the base shaft, and an unlocked configuration that allows the base ring to move relative to the mating section of the base shaft. In some cases, the eccentric locking mechanism further includes a cam lever in operative association with the base ring. The portable device may also include a stop coupled with the mating end of the base shaft. The stop can be configured to prevent the mating section of the base shaft from disengaging from the mating section of the stabilizer shaft. In related embodiments, the mating section of the base shaft may be telescopically engaged with the mating section of the stabilizer shaft. The stop can include a stop ring fixed about an exterior surface of the mating section of the base shaft and slidably engaged with an interior surface of the mating section of the stabilizer shaft.

In another embodiment, the present invention provides a method of using a portable device for stabilizing an arm or hand of a person. The method can include engaging a stabilizer of the portable device with the arm or hand of the person, where the stabilizer is coupled with a peripheral section of a stabilizer shaft, releasing an attachment assembly of the portable device such that a base ring of the attachment assembly is slidably engaged with a mating section of a base shaft while a stabilizer ring of the attachment assembly is fixed with a mating section of the stabilizer shaft, adjusting the length of the portable device by sliding the mating section of the stabilizer shaft in telescopic relation to the mating section of the base shaft, and locking the attachment assembly of the portable device by compressing the base ring of the attachment assembly such that the base ring is fixed with respect to the mating section of the base shaft. In a related embodiment, the method can also include engaging a garment clip first cleft with a garment worn by the person when the portable device is upright, and engaging a garment clip second cleft with the garment worn by the person when the portable device is inverted. In some cases, the step of engaging the garment clip first cleft with the garment can include engaging at least part of an inner elongate member and at least part of an outer elongate member with the garment, where the inner elongate member is disposed alongside and in fixed relation to the peripheral section of the base shaft and the outer elongate member is disposed alongside and in fixed relation to the inner elongate member. Engaging the garment clip second cleft with the garment can include engaging at least part of the inner elongate member and at least part of the peripheral section of the base shaft with the garment. In related embodiments, the method may also include engaging a base with a support body portion of the person, where the base is coupled with the peripheral section of the base shaft.

In another embodiment, the present invention provides a method of constructing a portable device for stabilizing an arm or hand of a person. The method can include coupling a stabilizer with a peripheral section of a stabilizer shaft, where the stabilizer is configured to engage the arm or hand of the person, placing a base shaft in slidable arrangement with the stabilizer shaft, the base shaft including a peripheral section and a mating section, coupling an attachment assembly with a mating section of the stabilizer shaft and the mating section of the base shaft, where the attachment assembly is configured to releasably fix the stabilizer shaft relative to the base shaft, and coupling a garment clip with the peripheral section of the base shaft. The garment clip can include a first cleft and a second cleft, where the first cleft is configured to engage a garment worn by the person when the device is upright, and the second cleft is configured to engage the garment worn by the person when the device is inverted. In some cases, the step of coupling the attachment assembly with the mating section of the stabilizer shaft and the mating section of the base shaft includes coupling a first clamp of the attachment assembly with the mating section of the stabilizer shaft and a first section of an intermediate shaft, where the first clamp is configured to releasably fix the stabilizer shaft relative to the intermediate shaft, and coupling a second clamp of the attachment assembly with a second section of the intermediate shaft and the mating section of the base shaft, where the second clamp is configured to releasably fix the intermediate shaft relative to the base shaft. In related embodiments, the step of coupling the first clamp can include fixing a first clamp stabilizer ring with the mating section of the stabilizer shaft and slidably engaging a first clamp base ring with the first section of the intermediate shaft. Similarly, the step of coupling the second clamp can include fixing a second clamp stabilizer ring with the second section of the intermediate shaft and slidably engaging a second clamp base ring with the mating section of the base shaft. In some embodiments, the method may further include coupling a base with the peripheral section of the base shaft, where the base is configured to contact a support body portion of the person. In further embodiments, the step of coupling the attachment assembly with the mating section of the stabilizer shaft and the mating section of the base shaft can include fixing a stabilizer ring of the attachment assembly with the mating section of the stabilizer shaft and slidably engaging a base ring of the attachment assembly with the mating section of the base shaft.

For a fuller understanding of the nature and advantages of the present invention, reference should be had to the ensuing detailed description taken in conjunction with the accompanying drawings.

DETAILED DESCRIPTION OF THE INVENTION

Figure 1:
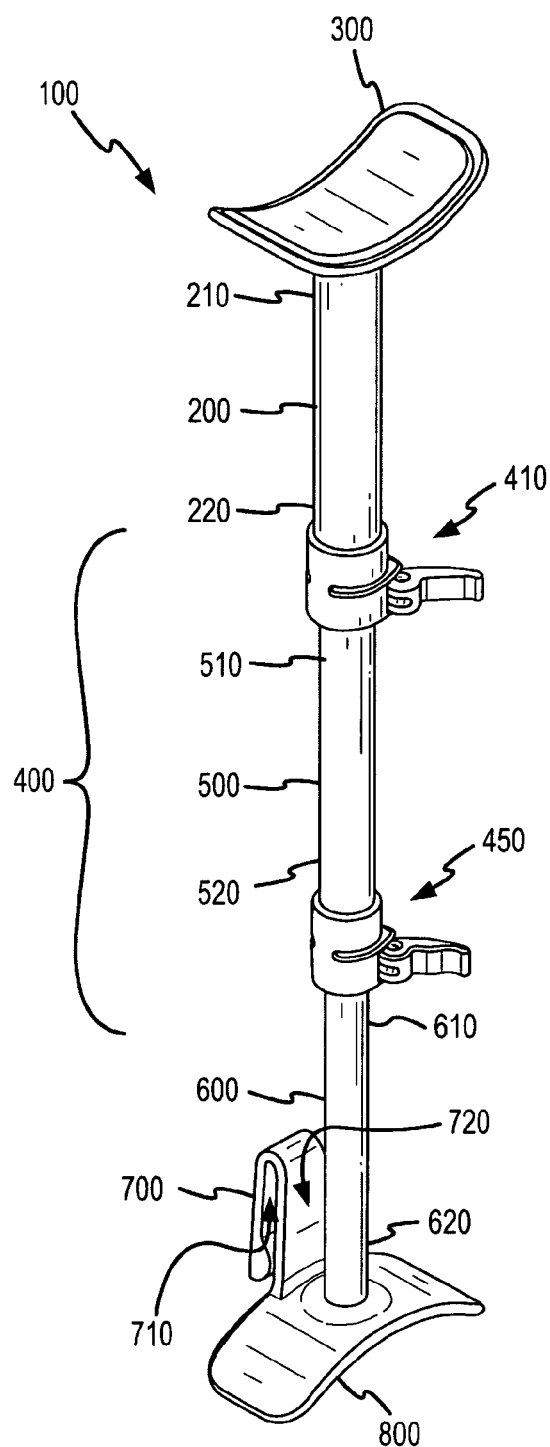
FIG. 1 illustrates a perspective view of a portable support device according to one embodiment of the present invention.
Figure 2:
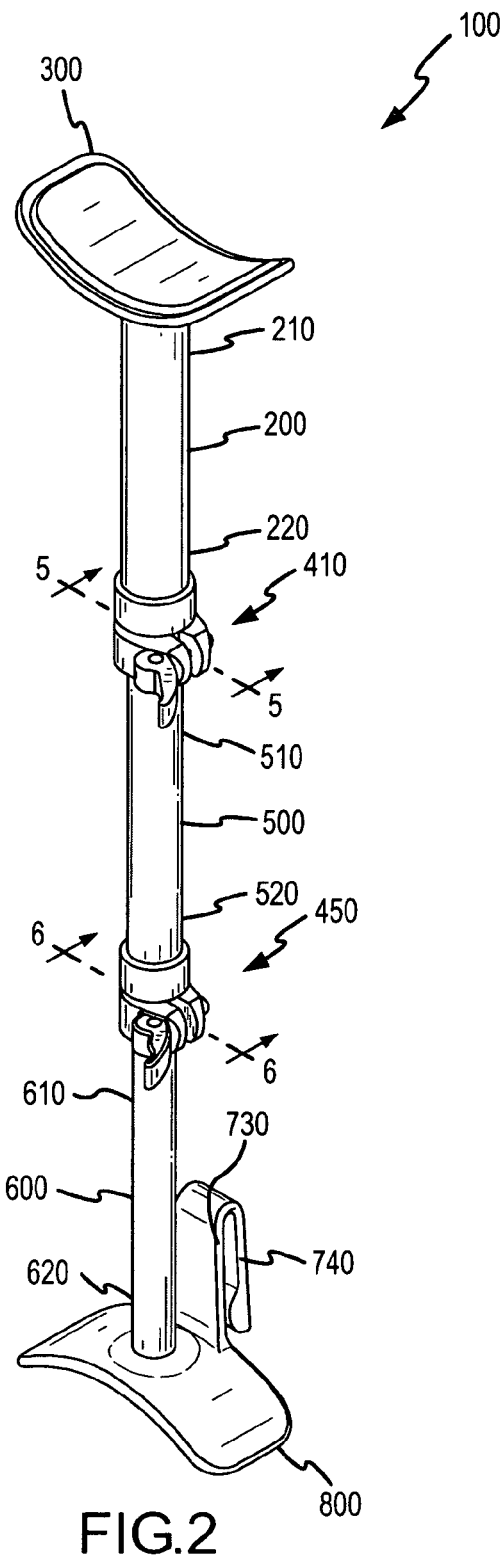
FIG. 2 illustrates a perspective view of a portable support device according to one embodiment of the present invention.

Turning now to the drawings, FIGS. 1 and 2 provide perspective illustrations of an exemplary portable device 100 for stabilizing an arm or hand of a person. Device 100 typically includes a stabilizer shaft 200, a stabilizer 300, an attachment assembly 400, a base shaft 600, a garment clip 700, and a base 800. Stabilizer shaft 200 can include a peripheral section 210 and a mating section 220. Stabilizer 300, which is often coupled with peripheral section 210 of stabilizer shaft 200, can be configured to contact, support, or otherwise engage a hand or arm 900 of a person (shown in FIGS. 8–10). In some embodiments, base shaft 600 is in slidable arrangement with stabilizer shaft 200. Attachment assembly 400 can couple a mating section 220 of stabilizer shaft 200 with a mating section 610 of base shaft 600. Attachment assembly 400 may be configured to releasably fix stabilizer shaft 200 relative to base shaft 600, so that the length of device 100 from stabilizer 300 to base 800 can be adjusted according to the operator's needs. Device 100 shown in FIGS. 1 and 2 is in an extended configuration.

In the embodiment depicted in FIG. 1, attachment assembly 400 includes a first clamp 410, a second clamp 450, and an intermediate shaft 500. First clamp 410 is in cooperative association with mating section 220 of stabilizer shaft 200 and a first section 510 of intermediate shaft 500. First clamp 410 can be configured to releasably fix stabilizer shaft 200 relative to intermediate shaft 500. Second clamp 450 is in cooperative association with a second section 520 of intermediate shaft 500 and a mating section 610 of the base shaft 600. Second clamp 450 can be configured to releasably fix intermediate shaft 500 relative to base shaft 600. Reference numerals 5 and 6 of FIG. 2 correspond to cross-section views of clamps 410 and 450 shown in FIGS. 5 and 6, respectively.

Garment clip 700 can be coupled with a peripheral section 620 of base shaft 600, and can include a first cleft 710 and a second cleft 720. First cleft 710 is often configured to engage a garment 910 worn by the person when device 100 is in an upright orientation (shown in FIGS. 8 and 10), whereas second cleft 720 may be configured to engage garment 910 when device 100 is in an inverted orientation (shown in FIG. 11). In some embodiments, first cleft 710 is at least partially defined by an inner elongate member 730 and an outer elongate member 740. Inner elongate member 730 can be disposed alongside and in fixed relation to peripheral section 620 of base shaft 620, and outer elongate member 740 can be disposed alongside and in fixed relation to inner elongate member 730. In related embodiments, second cleft 720 is at least partially defined by inner elongate member 730 and a portion of peripheral section 620 of base shaft 600. Base 800, which is often coupled with peripheral section 620 of base shaft 600, can be configured to contact or otherwise engage a support body portion 920 of the operator (shown in FIGS. 9 and 10). Support body portion 920 may be a leg, thigh, hip, knee, or any other convenient body portion of the operator. In some embodiments, garment clip 700 is fixed directly to base 800. Optionally, garment clip 700 may be fixed directly to peripheral section 620 of base shaft 600.

Figure 3A:
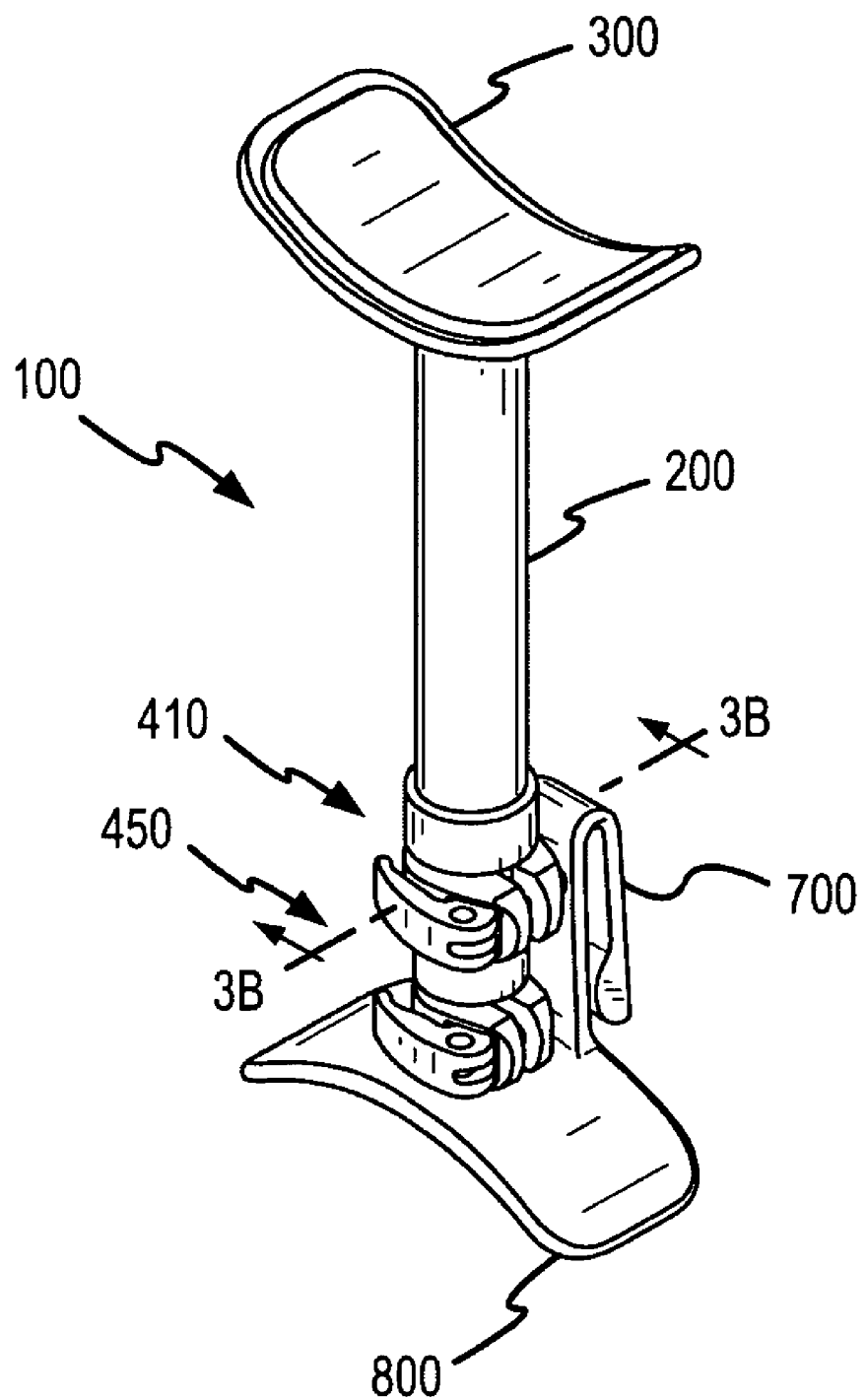
FIG. 3A illustrates a perspective view of a portable support device according to one embodiment of the present invention.
Figure 3B:
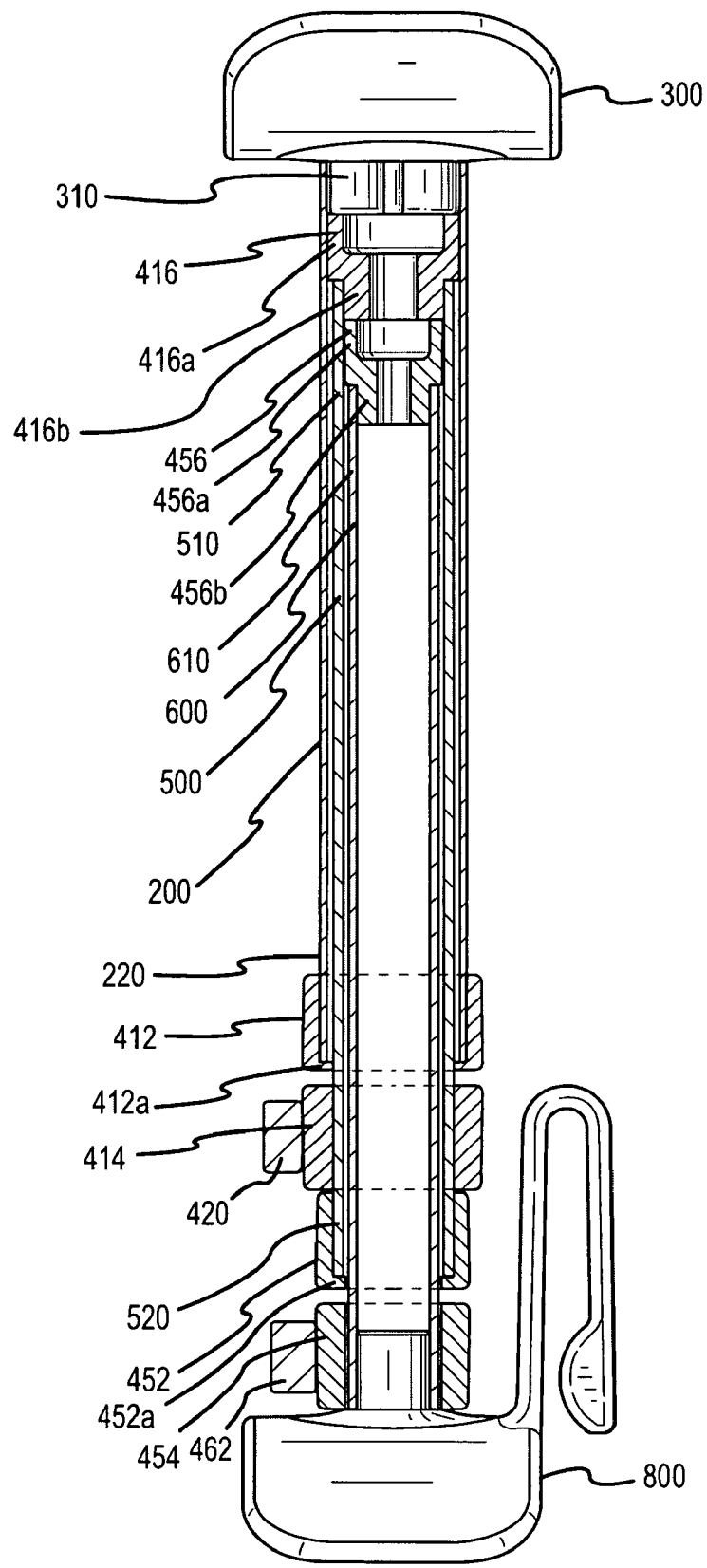
FIG. 3B illustrates a cross-section view of a portable support device according to one embodiment of the present invention.

In contrast with the extended configuration shown in FIGS. 1 and 2, a collapsed configuration for device 100 is illustrated by the perspective view of FIG. 3A. Another illustration of device 100 in a collapsed configuration is provided by the cross-section view of FIG. 3B, which shows the telescopic arrangement of base shaft 200, intermediate shaft 500, and base shaft 600. Device 100 can include stabilizer ring 412 which is fixed with mating section 220 of stabilizer shaft 200, and base ring 414 which is slidably engaged with intermediate shaft 500. As seen in FIGS. 3A and 3B, base shaft 600 is positioned so that it is almost entirely housed within intermediate shaft 500, and in turn, intermediate shaft 500 is positioned so that it is almost entirely housed by stabilizer shaft 200. Here, second cleft 720 is at least partially defined by inner elongate member 730 and a portion of first clamp 410 and second clamp 450. In a related embodiment, where intermediate shaft 500 is housed within stabilizer shaft 200, and base shaft 600 is extended outward from intermediate shaft 500 (e.g. a partially collapsed orientation), second cleft 720 could be at least partially defined by inner elongate member 730, a portion of peripheral section 620 of base shaft 600, and a portion of second clamp 450. In other configurations, second cleft 720 can be defined by any of a variety of combinations including portions of inner elongate member 730, first clamp 410, second clamp 450, and/or peripheral section 620 of base shaft 600.

Device 100 can also include a first clamp support scaffold 416 and a second clamp support scaffold 456. As seen in the embodiment depicted in FIG. 3B, first clamp support scaffold 416 includes an outer ring 416a that slides along the inside of stabilizer shaft 200, and an inner ring 416b that is coupled with first section 510 of intermediate shaft 500. Similarly, second clamp support scaffold 456 includes an outer ring 456a that slides along the inside of interior shaft 500, and an inner ring 456b that is coupled with mating section 610 of base shaft 600. When device 100 is in a completely collapsed orientation, first clamp support scaffold outer ring 416a can contact a stabilizer attachment 310. In comparison, when base shaft 600 is extended outward from intermediate shaft 500, second clamp support scaffold outer ring 456a can contact an inner lip 452a of a stabilizer ring 452. In this sense, second clamp support scaffold 456 provides a stop that is configured to prevent mating section 610 of base shaft 600 from disengaging from second section 520 of intermediate shaft 500. Similarly, when intermediate shaft 500 is extended outward from stabilizer shaft 200, first clamp support scaffold outer ring 416a can contact an inner lip 412a of a stabilizer ring 412. As a result, first clamp support scaffold 416 provides a stop that is configured to prevent first section 510 of intermediate section 500 from disengaging from mating section 220 of stabilizer shaft 200.

In some embodiments, first clamp support scaffold 416 includes outer ring 416a fixed about an exterior surface of first section 510 of intermediate shaft 500 or otherwise coupled thereto, but does not include inner ring 416b. In such embodiments, when intermediate shaft 500 is extended outward from stabilizer shaft 200, outer ring 416a can contact an inner lip 412a of a stabilizer ring 412. As a result, first clamp support scaffold 416 provides a stop that is configured to prevent first section 510 of intermediate section 500 from disengaging from mating section 220 of base shaft 200. It is appreciated that although device 100 is depicted here as having a single intermediate shaft 500, in other embodiments device may include any number of intermediate shafts 500, in any of a variety of sizes. Similarly, in other embodiments device 100 will include stabilizer shaft 200 and base shaft 600, but no intermediate shaft 500. In such cases, a single clamp support scaffold, which may also act as a stop, can be coupled with mating end 610 of base shaft 600. This single clamp support scaffold can be configured to prevent mating section 610 of base shaft 600 from disengaging from mating section 220 of stabilizer shaft 200. Similarly, it is appreciated that attachment assembly 400 can include any number of clamps. In some embodiments, the number of clamps may be one less than the number of shafts.

Figure 4:
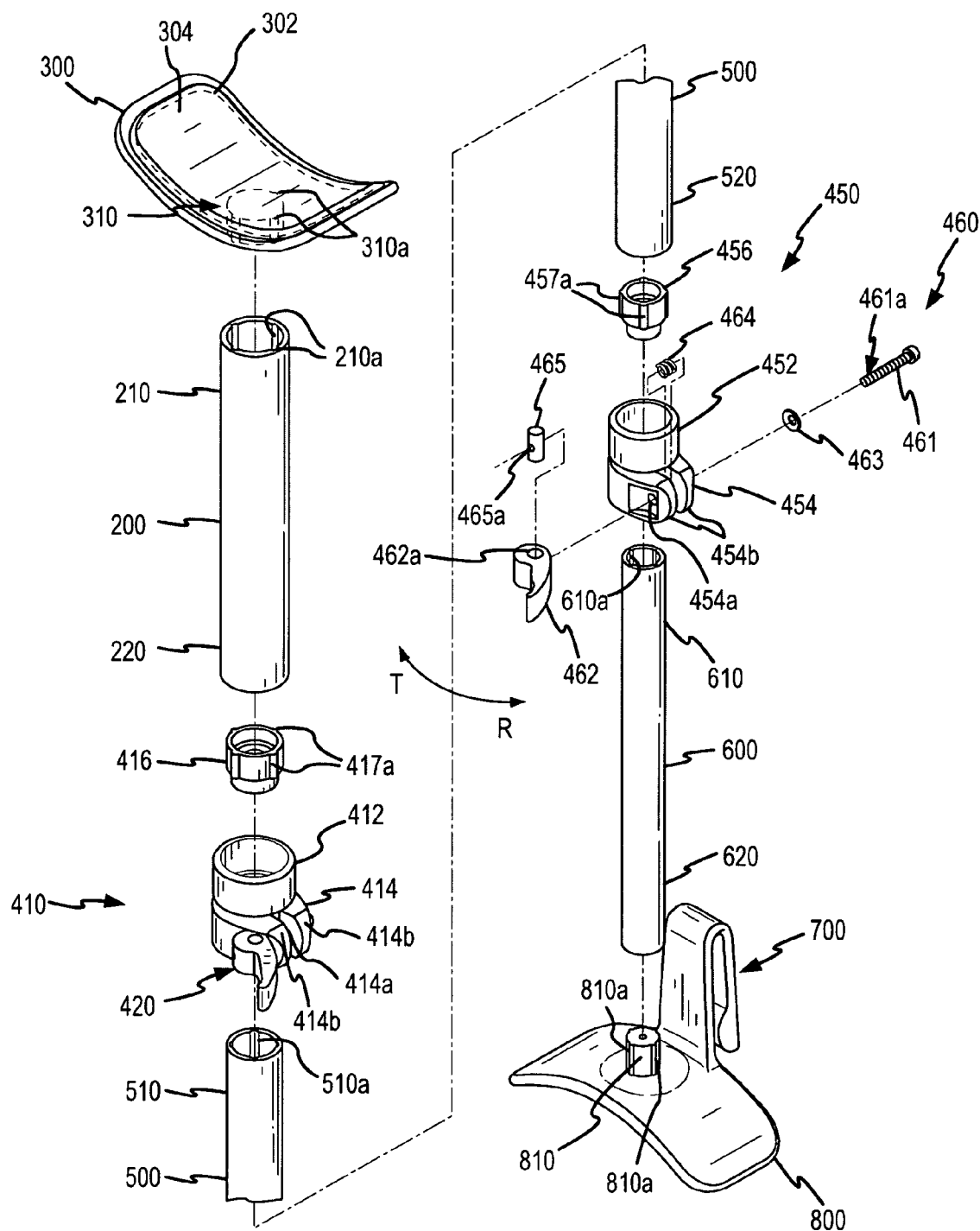
FIG. 4 illustrates an exploded perspective view of a portable support device according to one embodiment of the present invention.

FIG. 4 provides an exploded perspective view of device 100. As seen in this embodiment, stabilizer 300 can be releasably coupled with, or fixed with, peripheral section 210 of stabilizer shaft 200 via stabilizer attachment 310. Stabilizer 300 may be integral with stabilizer attachment 310, each representing different features of the same element. Alternatively, stabilizer 300 and stabilizer attachment 310 may be separate, joined pieces. Stabilizer 300 or stabilizer attachment 310 may be coupled with peripheral section 210 via any variety of attachment means, including screw arrangements, snap arrangements, and the like. In some cases, peripheral section 210 may include a plurality of recesses 210a configured to receive a corresponding plurality of projections 310a disposed on stabilizer attachment 310. The operative association between projections 310a and recesses 210a can help prevent rotation of stabilizer shaft 200 relative to stabilizer 300 during use, and can help align stabilizer shaft 200 with stabilizer 300 during production or manufacturing of device 100. First clamp support scaffold 416 is coupled with first section 510 of intermediate shaft 500, and is configured to slide within and along the inside of stabilizer shaft 200. In some cases, mating section 220 may also include plurality of recesses 210a configured to receive a corresponding plurality of projections 417a disposed on first clamp support scaffold 416. As shown here, first clamp support structure 416 is coupled with first section 510 of intermediate shaft 500. The operative association between projections 417a and recesses 210a can help prevent rotation of intermediate shaft 500 relative to stabilizer shaft 200 during use, and can help align intermediate shaft 500 with stabilizer shaft 200 during production or manufacturing of device 100. It is appreciated that recesses 210a may be disposed along the entire length of stabilizer shaft 200. In some cases, peripheral section 210 can be configured with means for direct attachment to a supported item. For example, peripheral section 210 can be configured with a universal camera screw for direct attachment with a camera or other recording device.

First clamp 410 includes stabilizer ring 412, a base ring 414 with two tabs 414b each having a locking aperture 414a, and an eccentric locking mechanism 420. Second clamp support scaffold 456 is coupled with mating section 610 of base shaft 600, and is configured to slide within and along the inside of intermediate shaft 500. In some cases, second section 520 of intermediate shaft 500 may include a plurality of recesses 510a configured to receive a corresponding plurality of projections 457a disposed on second clamp support scaffold 456. As shown here, second clamp support scaffold 456 is coupled with mating section 610 of base shaft 600, and the operative association between projections 457a and recesses 510a can help prevent rotation of base shaft 600 relative to intermediate shaft 500. It is appreciated that recesses 510a may be disposed along the entire length of intermediate shaft 500. Second clamp 450 includes stabilizer ring 452, a base ring 454 having two tabs 454b each having a locking aperture 454a, and an eccentric locking mechanism 460. Base 800 can be releasably coupled with, or fixed with, peripheral section 620 of base shaft 600 via a base attachment 810. Base 800 may be integral with base attachment 810, each representing different features of the same element. Alternatively, base 800 and base attachment 810 may be separate, joined pieces. Base 800 or base attachment 810 may be coupled with peripheral section 620 via any variety of attachment means, including screw arrangements, snap arrangements, and the like. In some cases, base attachment 810 may have projections 810a and peripheral section 620 may have corresponding recesses 610a for receiving those projections. The operative association between projections 810a and recesses 610a can help prevent rotation of base 800 relative to base shaft 600 during use, and can help align base 800 with base shaft 600 during production or manufacturing of device 100. It is appreciated that recesses 610a may be disposed along the entire length of base shaft 600.

An exploded perspective view of eccentric locking mechanism 460 is also provided in FIG. 4. Eccentric locking mechanism 460 includes a pin 461, a washer 463, a spring 464, a cam lever 462, and a pin anchor 465. Pin 461 passes through washer 463, a first locking aperture 454a (not shown), spring 464, a second locking aperture 454a, a side aperture (not shown) of cam lever 462, and into a side aperture 465a of pin anchor 465. Pin 461 may include a threaded section 461a that can be advanced into side aperture 465a at various depths. In some cases, washer 463 may be a Belleville washer. Similarly, it is appreciated that washer 463 may also be any of a variety of wave washers, cone washers, cupped spring washers, non-flat washers, or flat washers. In many cases, washer 463 will have a spring characteristic, and impart flexible quality to first clamp 410 and second clamp 450. Washer 463 can be useful for the long term operation of device 100 by allowing clamps 410, 450 to retain their effectiveness even if their components begin to creep or stretch. For example, molded plastic components will often deform when placed under stress for extended periods of time. In the present invention, however, as components of device 100 lose their shape due to long term stress created by clamps 410, 450, it is possible to compensate for this effect by incorporating a spring-like member into clamps 410, 450. For example, by adding a Belleville washer to clamps 410, 450, it is possible to maintain a clamp load despite component creep.

To tighten second clamp 450, the user can rotate cam lever 462 about pin anchor 465, in the direction indicated by arrow T. In effect, this draws tabs 454b closer together, thereby creating a stronger coupling between base ring 454 and mating section 610 of base shaft 600. In this configuration, the position of base ring 454 is fixed relative to mating section 610 of base shaft 600. Conversely, to release clamp 450, the user can rotate cam lever 462 about pin anchor 465, in the direction indicated by arrow R, thereby releasing tension between base ring 454 and mating section 610 of base shaft 600. In this configuration, base ring 454 can move more easily relative to mating section 610 of base shaft 600. Adjustments can be made to second clamp 450 by adjusting the depth at which a threaded section 461a is advanced into side aperture 465a of pin anchor 465. For example, a tighter configuration can be provided to second clamp 450 by screwing or otherwise advancing pin 461 further into pin anchor 465. A more relaxed configuration can be provided to second clamp 450 by screwing or otherwise retracting pin 461 further outward from pin anchor 465. It is understood that first clamp 410 can be operated in a similar fashion. It is appreciated in addition to the clamping approaches provided herein, the present invention contemplates the incorporation of any of a variety of other quick release mechanisms. The exposed surface of support 300 may include a groove 302 disposed around its periphery, which is adapted to receive and couple with the edges of a pad 304. Pad 304 may be constructed of any of a variety or combinations of materials, such as leather, plastic, cloth, and the like. The exposed surface of base 800 may be similarly constructed.

The present invention also provides methods for using device 100. In use, a person can operate the device 100 to stabilize their hand or arm 900 as follows. The operator will typically release attachment assembly 400 of the portable device 100 such that base ring 414 of attachment assembly 400 is slidably engaged with mating section 510 of intermediate shaft 500 while stabilizer ring 412 of attachment assembly 400 is fixed with mating section 220 of stabilizer shaft 200. The operator may then adjust the length of portable device 100 by sliding stabilizer shaft 200 in telescopic relation intermediate shaft 500. When the desired position of stabilizer shaft 200 relative to intermediate shaft 500 is achieved, the operator may lock attachment assembly 400 of portable device 100, for example, by compressing base ring 414 of attachment assembly such that the base ring 414 is fixed with respect to intermediate shaft 500. A similar adjustment can be made to second clamp 450 such that intermediate shaft 500 is suitably fixed in relation to base shaft 600.

Often, use of device 100 will include engaging garment clip first cleft 710 with garment 910 when portable device 100 is upright, and engaging garment clip second cleft 720 with garment 910 when the portable device 100 is inverted. The operator may engage garment clip first cleft 710 with garment 910 by engaging at least part of inner elongate member 730 and at least part of outer elongate member 740 with garment 910. Often, such engagement will include contacting garment 910 with a curved portion of garment clip 700 that connects inner elongate member 730 with outer elongate member 740. Similarly, operator may engage garment clip second cleft 720 with garment 910 by engaging at least part of inner elongate member 730 and at least part of peripheral section 620 of base shaft 600 with the garment 910. It is appreciated that use of device 100 may also include engaging base 800 with support body portion 920 of the person. Typically, base 800 is coupled with peripheral section 620 of base shaft 600.

The present invention also provides methods for constructing device 100. An exemplary construction method can include coupling stabilizer 300 with peripheral section 210 of stabilizer shaft 200, placing base shaft 600 in slidable arrangement with stabilizer shaft 200, and coupling attachment assembly 400 with mating section 220 of stabilizer shaft 200 and mating section 610 of base shaft 600, where attachment assembly 400 is configured to releasably fix stabilizer shaft 200 relative to base shaft 600. Construction methods can also include coupling garment clip 700 with peripheral section 620 of base shaft, where garment clip 700 is constructed to include first cleft 710 and second cleft 720, such that first cleft 710 is configured to engage garment 910 worn by the operator when device 100 is upright, and second cleft 720 is configured to engage garment 910 when device 100 is inverted. In some cases, coupling attachment assembly 400 with mating section 220 of stabilizer shaft 200 and mating section 610 of base shaft 600 includes fixing stabilizer ring 412 of attachment assembly 400 with mating section 220 of stabilizer shaft 200 and slidably engaging base ring 414 of attachment assembly 400 with mating section 610 of base shaft 600.

In other cases, coupling attachment assembly 400 with mating section 220 of stabilizer shaft 200 and mating section 610 of base shaft 600 includes coupling first clamp 410 of attachment assembly 400 with mating section 220 of stabilizer shaft 200 and first section 510 of intermediate shaft 500, where first clamp 410 is configured to releasably fix stabilizer shaft 200 relative to intermediate shaft 500. The step of coupling attachment assembly 400 with mating section 220 of stabilizer shaft 200 and mating section 610 of base shaft 600 can also include coupling second clamp 450 of attachment assembly 400 with second section 520 of intermediate shaft 500 and mating section 610 of base shaft 600, where second clamp 450 is configured to releasably fix intermediate shaft 500 relative to base shaft 600.

In some cases, coupling first clamp 410 with mating section 220 of stabilizer shaft 200 and first section 510 of intermediate shaft 500 includes fixing first clamp stabilizer ring 412 with mating section 220 of stabilizer shaft 200 and slidably engaging first clamp base ring 414 with first section 510 of intermediate shaft 500. Similarly, coupling second clamp 450 with second section 520 of intermediate shaft 500 and mating section 610 of base shaft 600 can include fixing second clamp stabilizer ring 452 with second section 520 of intermediate shaft 500 and slidably engaging second clamp base ring 454 with mating section 610 of base shaft 600. The construction methods of the present invention may also include coupling base 800 with peripheral section 620 of base shaft 600.

Figure 5:
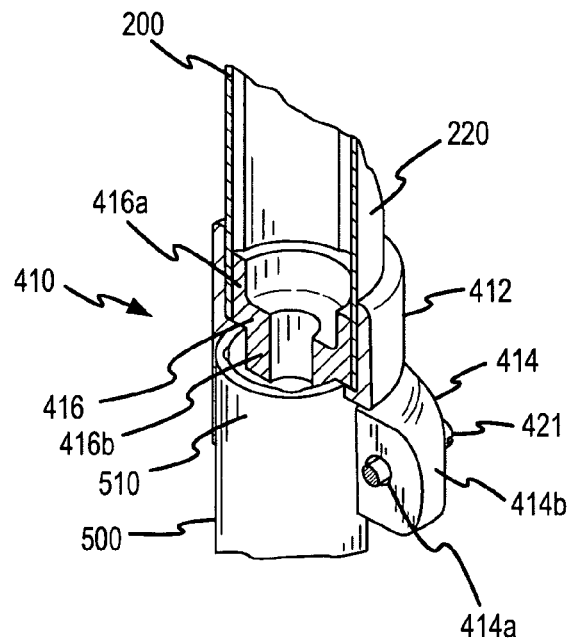
FIG. 5 shows a partial cutaway view of a portable support device according to one embodiment of the present invention.
Figure 6:
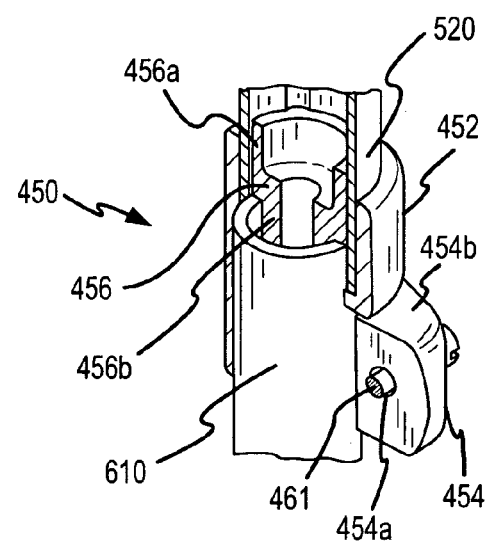
FIG. 6 shows a partial cutaway view of a portable support device according to one embodiment of the present invention.
Figure 7A:
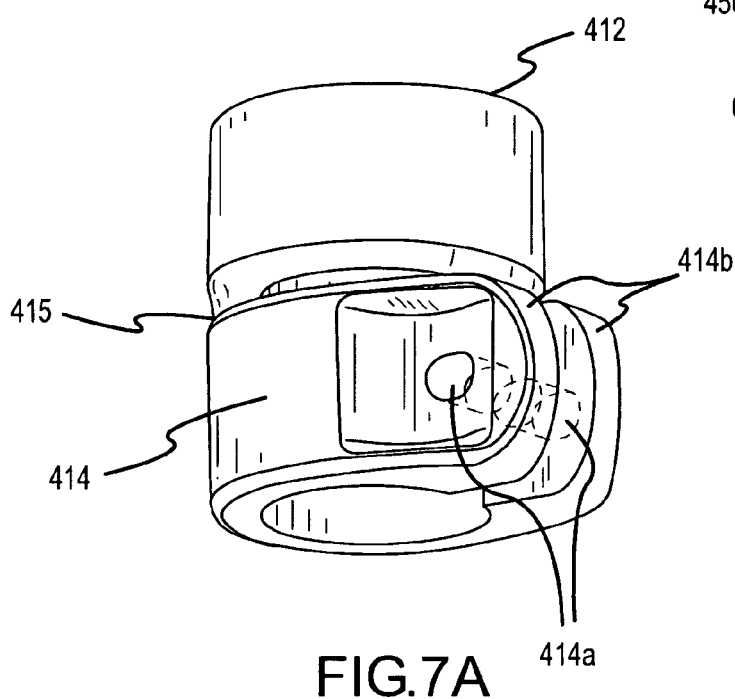
FIG. 7A shows a perspective view of a clamp according to one embodiment of the present invention.
Figure 7B:
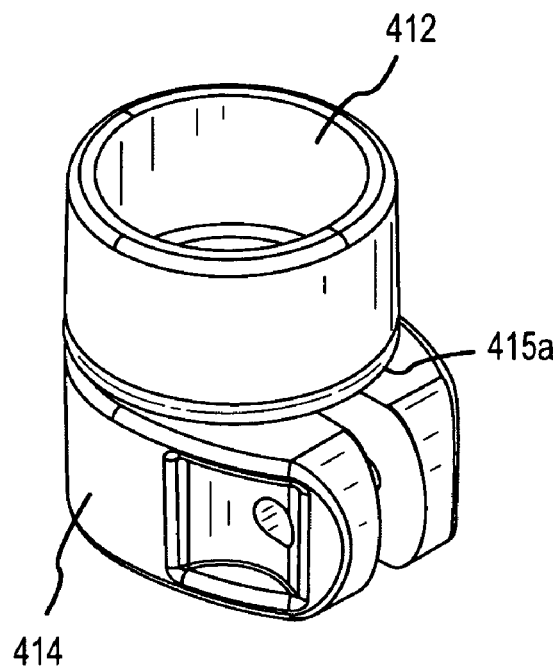
FIG. 7B shows a perspective view of a clamp according to one embodiment of the present invention.
Figure 7C:
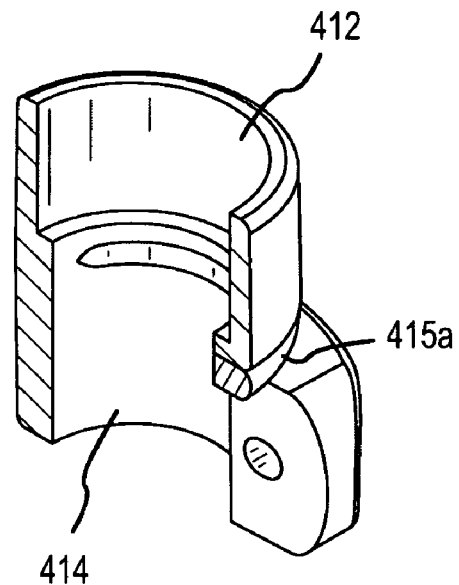
FIG. 7C shows a cutaway view of a clamp according to one embodiment of the present invention.

A cross-section view of first clamp 410 is provided by FIG. 5. First clamp 410 includes stabilizer ring 412, base ring 414 having locking aperture 414a, tab 414b, and pin 421. As noted above, when first clamp 410 is tightened, base ring 414 is squeezed more tightly about first section 510 of intermediate shaft 500. Similarly, a cross-section view of second clamp 450 is provided by FIG. 6. Second clamp 450 includes stabilizer ring 452, base ring 454 having locking aperture 454a, tab 454b, and pin 461. When second clamp 450 is tightened, base ring 454 is squeezed more tightly about mating section 620 of base shaft 600. FIG. 7A provides a perspective view of first clamp 410. First clamp 410 includes stabilizer ring 412 and base ring 414 having two tabs 414b, each with one locking aperture 414a. Stabilizer ring 412 can be coupled with base ring 414 via a bridge 415. It is appreciated that in some embodiments, first clamp 410 and second clamp 420 will share many, if not all, of the same features. As seen in FIGS. 7B and 7C, first clamp 410 can include a spacer disk 415a disposed in the gap between stabilizer ring 412 and base ring 414. Spacer disk, which is often a C-shaped element, can inhibit flexing in first clamp 410 at bridge 415. This can be useful, for example when intermediate shaft 500 is extended outward from support shaft 200 in an extended orientation as depicted in FIG. 5, and compressive forces applied to device 100 operate to urge or pinch stabilizer ring 412 and base ring 414 toward one another. Second clamp 450 may also include a similar spacer disk (not shown).

Figure 8:
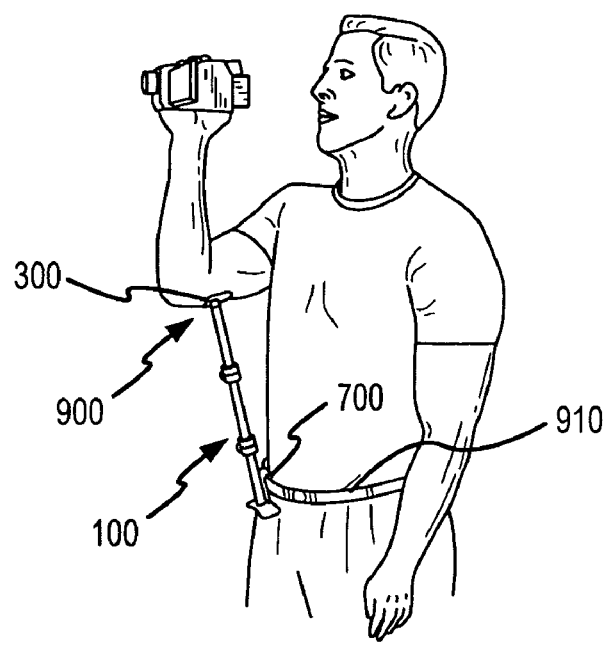
FIG. 8 illustrates a perspective view of a portable support device according to one embodiment of the present invention.

FIG. 8 depicts a person using device 100 when it is in an extended configuration. Garment clip 700 is coupled with garment 910. More specifically, first cleft 710 of garment clip 700 is coupled with garment 910. In this embodiment, garment 910 is a belt worn around the operator's waist. Stabilizer 300 is engaged with arm 900 of the operator. In the example shown here, the operator is holding a video camera. It is appreciated that in some instances, an operator may utilize one device 100 to support the right arm, and another device 100 to support the left arm. Use of two devices 100 is particularly useful when the operator is holding a camera or other apparatus that requires or benefits from two-handed control. For example, a separate device 100 can be used to support each arm 900 of the operator, when operating binoculars.

Figure 9:
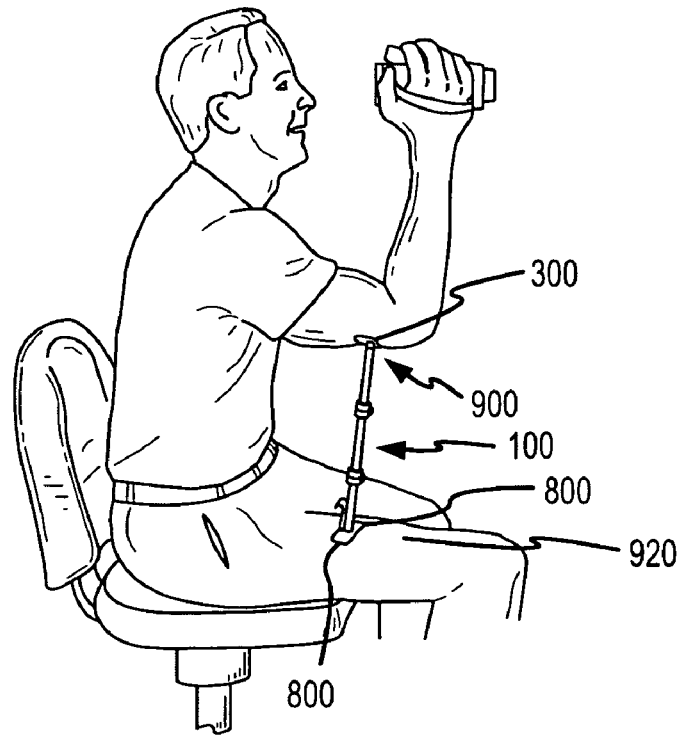
FIG. 9 illustrates a perspective view of a portable support device according to one embodiment of the present invention.
Figure 10:
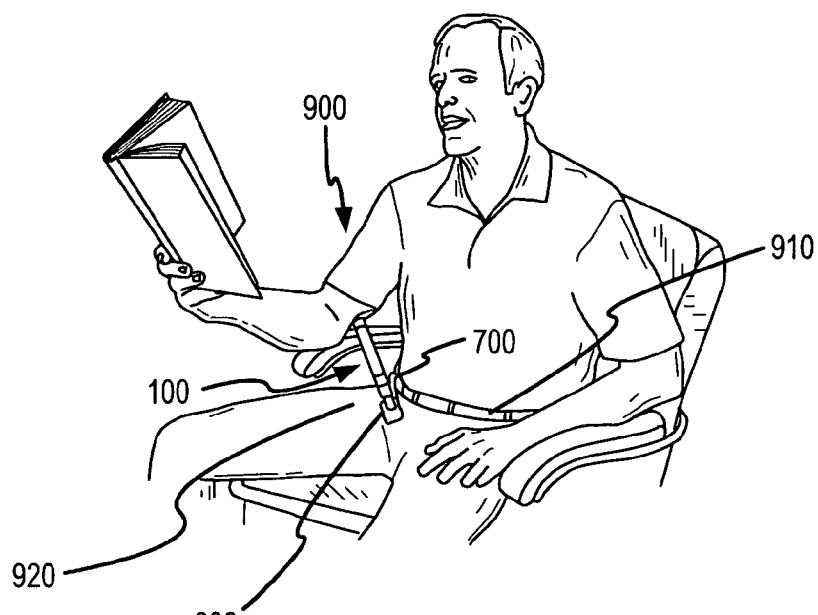
FIG. 10 illustrates a perspective view of a portable support device according to one embodiment of the present invention.
Figure 11A:
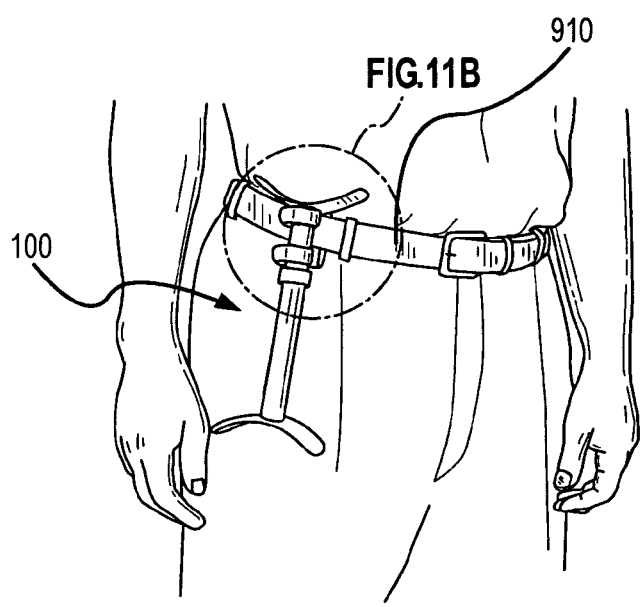
FIGS. 11A and 11B show perspective views of a portable support device according to one embodiment of the present invention.
Figure 11B:
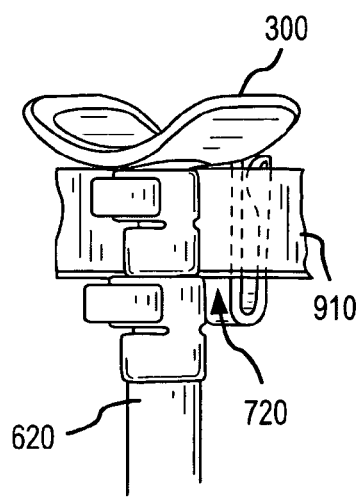

Another illustration of a person using device 100 is shown in FIG. 9. Base 800 is contacted with support body portion 920 of the operator, which in this case is the operator's leg. It is appreciated that base 800 can be shaped in any of a variety of configurations, so as to effectively interface with various body parts of the operator, such as the hip, the knee, the waist, and the like. Stabilizer 300 is contacted with the operator's arm 900. It is appreciated that device 100 may be expanded or collapsed to any of a variety of lengths, so as to meet the needs of the operator. FIG. 10 provides still another illustration of a person using device 100. Base 800 is contacted with support body portion 920 of the operator, which in this case is the operator's thigh or waist. Stabilizer 300 is contacted with the operator's arm 900. Garment clip 700 is coupled with garment 910. FIGS. 11A and 11B depict device 100 in an inverted orientation. As seen here, cleft 720 of garment clip 700 can engage garment 910. When carrying device 100 in an inverted orientation, the operator will often find it useful to shorten the length of device 100 by placing it in a collapsed configuration.

The above provides a full and complete disclosure of certain embodiments of the present invention for purposes of clarity and understanding. However, it will be appreciated that various modifications, alternate constructions, and equivalents may be employed as desired. Therefore, the above description and illustrations should not be construed as limiting the invention, which is defined by the appended claims.

What is claimed is:

1. A portable device for stabilizing an arm or hand of a person, the device comprising:
   a stabilizer shaft including a peripheral section and a mating section;
   a stabilizer coupled with the peripheral section of the stabilizer shaft and configured to engage the arm or hand of the person;
   a base shaft in slidable arrangement with the stabilizer shaft, the base shaft including a peripheral section and a mating section;
   an attachment assembly in cooperative association with the mating section of the stabilizer shaft and the mating section of the base shaft, the attachment assembly configured to releasably fix the stabilizer shaft relative to the base shaft; and
   a garment clip coupled with the peripheral section of the base shaft, the garment clip including a first cleft and a second cleft, wherein the first cleft is configured to engage a garment worn by the person when the device is upright, and the second cleft is configured to engage the garment worn by the person when the device is inverted.

2. The portable device of claim 1, wherein the attachment assembly comprises:
   an intermediate shaft having a first section and a second section;
   a first clamp in cooperative association with the first section of the intermediate shaft and the mating section of the stabilizer shaft, the first clamp configured to releasably fix the stabilizer shaft relative to the intermediate shaft; and
   a second clamp in cooperative association with the second section of the intermediate shaft and the mating section of the base shaft, the second clamp configured to releasably fix the intermediate shaft relative to the base shaft.

3. The portable device of claim 1, wherein the first cleft is at least partially defined by an inner elongate member disposed alongside and in fixed relation to the peripheral section of the base shaft and an outer elongate member disposed alongside and in fixed relation to the inner elongate member, and the second cleft is at least partially defined by the inner elongate member and a portion of the peripheral section of the base shaft.

4. The portable device of claim 1, wherein the garment clip is fixed directly to the peripheral section of the base shaft.

5. The portable device of claim 1, further comprising a base coupled with the peripheral section of the base shaft, the base configured to contact a support body portion of the person.

6. The portable device of claim 5, wherein the garment clip is fixed directly to the base.

7. The portable device of claim 1, wherein the attachment assembly includes a clamp comprising:
a stabilizer ring fixed with the mating section of the stabilizer shaft; and
a base ring slidably engaged with the base shaft.

8. The portable device of claim 7, wherein the clamp further comprises an eccentric locking mechanism in operative association with the base ring, the locking mechanism having a locked configuration that fixes the position of the base ring relative to the mating section of the base shaft, and an unlocked configuration that allows the base ring to move relative to the mating section of the base shaft.

9. The portable device of claim 8, wherein the eccentric locking mechanism further comprises a cam lever in operative association with the base ring.

10. The portable device of claim 1, further comprising a stop coupled with the mating end of the base shaft, the stop configured to prevent the mating section of the base shaft from disengaging from the mating section of the stabilizer shaft.

11. The portable device of claim 10, wherein the mating section of the base shaft is telescopically engaged with the mating section of the stabilizer shaft, and the stop comprises a stop ring fixed about an exterior surface of the mating section of the base shaft and slidably engaged with an interior surface of the mating section of the stabilizer shaft.

12. A method of using a portable device for stabilizing an arm or hand of a person, the method comprising:
engaging a stabilizer of the portable device with the arm or hand of the person, the stabilizer coupled with a peripheral section of a stabilizer shaft;
releasing an attachment assembly of the portable device such that a base ring of the attachment assembly is slidably engaged with a mating section of a base shaft while a stabilizer ring of the attachment assembly is fixed with a mating section of the stabilizer shaft;
adjusting the length of the portable device by sliding the mating section of the stabilizer shaft in telescopic relation to the mating section of the base shaft; and
locking the attachment assembly of the portable device by compressing the base ring of the attachment assembly such that the base ring is fixed with respect to the mating section of the base shaft; and
engaging a garment clip first cleft with a garment worn by the person when the portable device is upright, and engaging a garment clip second cleft with the garment worn by the person when the portable device is inverted.

13. The method of claim 12, wherein engaging the garment clip first cleft with the garment comprises engaging at least part of an inner elongate member and at least part of an outer elongate member with the garment, the inner elongate member disposed alongside and in fixed relation to the peripheral section of the base shaft and the outer elongate member disposed alongside and in fixed relation to the inner elongate member, and wherein engaging the garment clip second cleft with the garment comprises engaging at least part of the inner elongate member and at least part of the peripheral section of the base shaft with the garment.

14. The method of claim 12, further comprising engaging a base with a support body portion of the person, wherein the base is coupled with a peripheral section of the base shaft.

15. A method of constructing a portable device for stabilizing an arm or hand of a person, the method comprising:
coupling a stabilizer with a peripheral section of a stabilizer shaft, the stabilizer configured to engage the arm or hand of the person;
placing a base shaft in slidable arrangement with the stabilizer shaft, the base shaft including a peripheral section and a mating section;
coupling an attachment assembly with a mating section of the stabilizer shaft and the mating section of the base shaft, the attachment assembly configured to releasably fix the stabilizer shaft relative to the base shaft; and
coupling a garment clip with the peripheral section of the base shaft, the garment clip including a first cleft and a second cleft, wherein the first cleft is configured to engage a garment worn by the person when the device is upright, and the second cleft is configured to engage the garment worn by the person when the device is inverted.

16. The method of claim 15, wherein coupling the attachment assembly with the mating section of the stabilizer shaft and the mating section of the base shaft comprises:
coupling a first clamp of the attachment assembly with the mating section of the stabilizer shaft and a first section of an intermediate shaft, the first clamp configured to releasably fix the stabilizer shaft relative to the intermediate shaft; and
coupling a second clamp of the attachment assembly with a second section of the intermediate shaft and the mating section of the base shaft, the second clamp configured to releasably fix the intermediate shaft relative to the base shaft.

17. The method of claim 16, wherein coupling the first clamp comprises fixing a first clamp stabilizer ring with the mating section of the stabilizer shaft and slidably engaging a first clamp base ring with the first section of the intermediate shaft, and wherein coupling the second clamp comprises fixing a second clamp stabilizer ring with the second section of the intermediate shaft and slidably engaging a second clamp base ring with the mating section of the base shaft.

18. The method of claim 15, further comprising coupling a base with the peripheral section of the base shaft, the base configured to contact a support body portion of the person.

19. The method of claim 15, wherein coupling the attachment assembly with the mating section of the stabilizer shaft and the mating section of the base shaft comprises fixing a stabilizer ring of the attachment assembly with the mating section of the stabilizer shaft and slidably engaging a base ring of the attachment assembly with the mating section of the base shaft.

* * * * *